United States Patent
Miyata et al.

(10) Patent No.: US 6,467,941 B1
(45) Date of Patent: Oct. 22, 2002

(54) VEHICLE LIGHTING UNIT

(75) Inventors: Osamu Miyata; Hisao Hirata; Yasuhisa Yaguchi; Kunio Iwaki; Isamu Satoh, all of Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 09/570,046

(22) Filed: May 12, 2000

(30) Foreign Application Priority Data

May 14, 1999 (JP) ............................... 11-134301

(51) Int. Cl.$^7$ ................................... B60Q 1/00
(52) U.S. Cl. .................... 362/519; 362/265; 362/264
(58) Field of Search ........................ 362/519, 538, 362/539, 265, 264, 294

(56) References Cited

U.S. PATENT DOCUMENTS

| 4,779,179 A | 10/1988 | Oyama et al. ............ 362/346 |
| 5,158,352 A | 10/1992 | Ikegami et al. ............ 362/71 |
| 5,627,428 A | 5/1997 | Helbig et al. ........ 313/318.01 |
| 5,636,917 A | 6/1997 | Furami et al. ............ 362/61 |
| 5,722,768 A * | 3/1998 | Suzuki et al. ............ 362/265 |
| 6,084,354 A * | 7/2000 | Kohmura et al. ....... 362/265 X |
| 6,176,604 B1 * | 1/2001 | Dubrovin et al. .......... 362/539 |

FOREIGN PATENT DOCUMENTS

JP          06243830          9/1994

* cited by examiner

Primary Examiner—Stephen Husar
(74) Attorney, Agent, or Firm—Morgan, Lewis & Bockius LLP

(57) ABSTRACT

A vehicle discharge lighting unit can include a bulb mounting slot provided in a resin base. The mounting slot has a channel diameter that fits with an outer bulb of a lamp. A flange can be provided for mounting the resin base to a reflector. A burner band mounting section of the base can extend towards the lamp along a discharge chamber direction and project within the reflector. The driver case can also be separated into a front case and a rear case. The resin base and the driver case can therefore be most appropriately shaped while also having improved dielectric strength. When either of the base or the driver case is defective, only the part that is defective needs to be replaced.

18 Claims, 2 Drawing Sheets

VEHICLE LIGHTING UNIT

This application claims priority to Japanese Patent Application No. HEI 11-134301, which was filed on May 14, 1999 and is hereby incorporated by reference.

BACKGROUND OF THE INVENTION

1. Field of the Invention

The invention relates to a vehicle lamp, and more specifically to a structure for a lighting unit that utilizes a discharge lamp such as a metal halide discharge lamp, etc. as a light source for lighting a headlamp.

2. Description of Related Art

A discharge lamp 91, as shown in FIG. 3, is typically used as a light source for a headlamp and includes a resin base 92 located at a predetermined position on the reflector 81 of the headlamp 80. A flange section 92a is provided at the resin base 92, so as to position the base 92 with respect to the reflector 81.

A metal burner band 91b is mounted adjacent an outer bulb 91a of the discharge lamp 91 and is welded to the resin base 92. The position of the discharge lamp 91 and the resin base 92 is determined with reference to the flange section 92a. A discharge chamber 91c can be given a predetermined position by fitting the lamp 91 to the reflector 81. Ceramic plate 94 is provided to protect the resin base 92 from high temperature when the discharge lamp 91 is lit.

When the discharge lamp 91 is started, approximately 25,000V is applied to the lamp. Electrical wiring is provided to supply the high voltage to the resin base 92. The high voltage wiring extends to the outside of the headlamp 80 and should therefore be housed.

As shown in FIG. 4, for example, Japanese Patent Publication Laid-open No. HEI. 8-315624, a driver case 93 is formed integrally with the resin base 92, and houses a starter circuit and a high voltage transformer (not shown) within the driver case 93 to create a lighting unit 90. A headlamp 90 can then be implemented with a 12V supply.

With the above lighting unit 90, the structure for mounting to the reflector 81 is the same as with the structure for mounting to the resin base 92 of lighting unit 80. When the reflector 81 is mounted as shown in FIG. 3, electrical leaks may occur between the electrodes and the metal plated reflector 81 or between the electrodes and a hood 82 mounted to the reflector 81.

In addition, when either one of the discharge lamp 91 or the drive case 93 is defective, the whole lighting unit 90 has to be replaced because the driver case 93 is formed integrally with the resin base 92. This design does not effectively utilize resources. It is also necessary to separate the driver case 93 and the discharge lamp 91 when the unit is scrapped, which is a difficult operation and increases overall costs.

SUMMARY OF THE INVENTION

Additional features and advantages of the invention will be set forth in the description that follows, and in part, will be apparent from the description, or may be learned by practice of the invention. The objectives and other advantages of the invention will be realized and achieved by the structure particularly out in the written description and claims hereof as well as the appended drawings.

In order to resolve the aforementioned problems, an embodiment of the invention provides a vehicle discharge lighting unit with an integrally formed discharge lamp, starter circuit, and high voltage transformer which includes a bulb mounting slot, a mounting flange, and a burner band mounting section. The bulb mounting slot is provided at a resin base mounted at a discharge lamp bulb section, whose slot diameter fits with an outer bulb of the discharge lamp bulb section and has a broad input-side slot width. The mounting flange supports the resin base on a reflector. A driver case which houses the starter circuit and high voltage transformer can also be mounted to the reflector. The burner band mounting section extends along a discharge chamber direction and project within the reflector.

To achieve this and other advantages, and in accordance with the purpose of the invention, as embodied and broadly described the invention provides a vehicle lighting unit including a lamp, starter circuit, and transformer, said unit including a base having a bulb mounting slot located at a discharge lamp bulb section, a driver case which houses the starter circuit and the transformer, a reflector, a mounting flange for supporting the base and mounting the driver case to the reflector and a burner band mounting section extending towards the lamp and projecting within the reflector.

In accordance with another aspect of the invention, a vehicle lighting unit includes a base having a mounting slot, a lamp positionably located in the mounting slot on the base, a driver unit including a transformer and a starter circuit, a driver case for housing the driver unit, the driver case including means for mounting the base at a predetermined position relative to the driver case and for being removably attached to the base.

In accordance with yet another aspect of the invention, a method for assembling a vehicle lighting unit that includes the steps of positioning a lamp in a mounting slot on a base, attaching the base in a driver case, and connecting the driver case to a reflector. The method is for assembling a lamp that includes a base having a mounting slot, a lamp positionably located in the mounting slot on the base, a driver unit, and a driver case configured to house the driver unit and mount the base at a predetermined position, the base being removably attached to the driver case.

Further, in the invention, the driver case can be formed so as to be separable into a front case and a rear case along a direction of the resin base that is substantially orthogonal to the axis of the discharge lamp. The resin base supporting the discharge lamp also can be formed integrally with the front case so that changing of the discharge lamp is possible.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENTS

Figure 1:
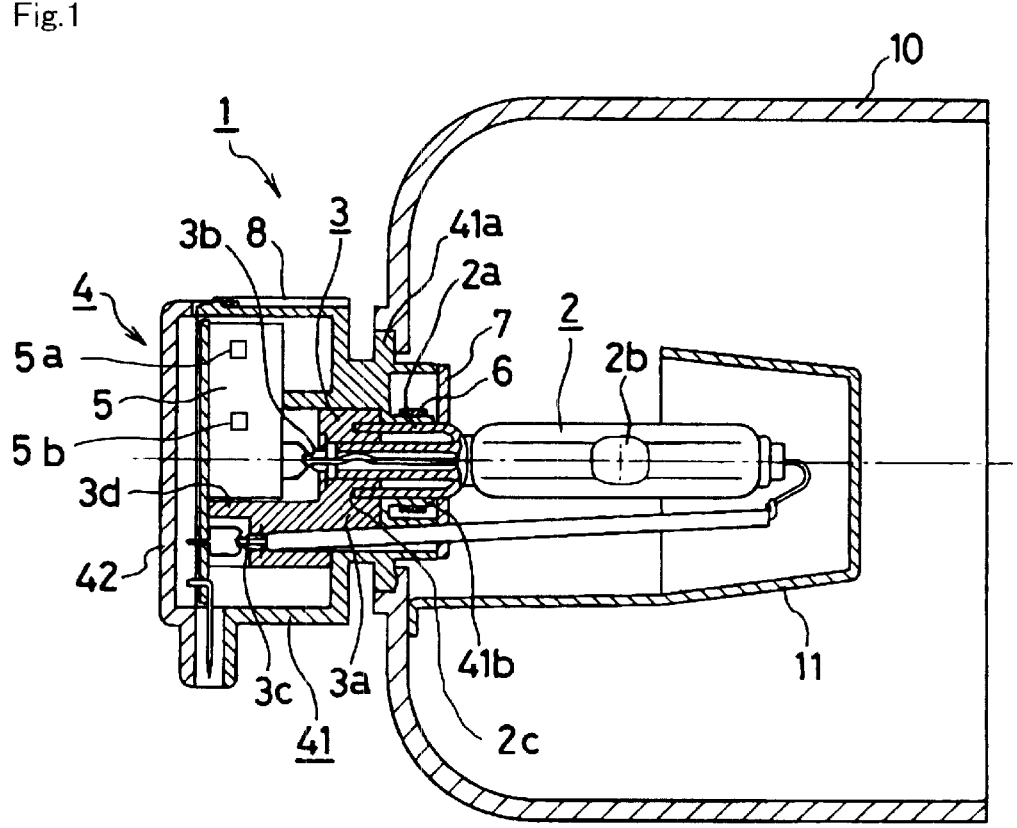
FIG. 1 is a cross-section view of an embodiment of a vehicle discharge lighting unit of the invention.

A detailed description of the invention is provided below based on embodiments shown in the drawings. FIG. 1 is a cross-sectional side view of a vehicle discharge lighting unit 1 relating to the invention. The lighting unit 1 includes a discharge lamp 2, resin base 3 and driver case 4.

In the invention, the resin base 3 for supporting the discharge lamp 2 is not formed integrally with the driver case 4. Rather, the structures have a configuration that optimizes containment of the high voltage wires and allows easy maintenance, broader design parameters, etc.

In this embodiment of the invention, a flange is not provided at the resin base 3. Instead, a bulb mounting slot 3a engages with the end of an outer bulb 2a of the discharge lamp 2. The resin base 3 itself determines its positioning with respect to the discharge lamp 2.

The slot width of the bulb mounting slot 3a can be made appropriately broader than the thickness of the outer bulb 2a on the entrance side, and can be substantially the same thickness of the outer bulb 2a near the bottom of the slot 3a. There can be tolerance provided with regard to this fitting to allow the discharge chamber 2b to be moved about and aligned with the reflector.

The resin base 3 can include a high voltage terminal 3b and a low voltage terminal 3c for supplying power to the discharge lamp 2. A partition wall 3d can be placed between the terminals 3b and 3c so as to ensure dielectric strength and resistance to high voltages (25,000V) applied between the terminals 3b and 3c.

The driver case 4 can include a body 41 and a cover 42 sealed in a box shape. The body 41 can include a resin base 3 with discharge lamp 2 insertable at an open side when the cover 42 is removed. The body 41 can be provided with a portion that partially covers the resin base 3 from the side of the discharge lamp 2 so that a position of the resin base 3 can be determined by a projection 2c when inserted. The body 41 can also house a driver unit 5 which includes a starter circuit 5a, a high voltage transformer 5b, along with other electric driver components.

In the present invention, a mounting flange 41a can be provided around the body 41 so as to position the lamp components and, in particular, to position the reflector 10 with respect to the body 41. In addition, a burner band mounting section 41b that projects towards the reflector 10 can be provided on the body 41.

When the lighting unit 1 of the invention is assembled, an inner end of the outer bulb 2a can be inserted in the bulb mounting slot 3a and wired to the high voltage terminal 3b. The resin base 3 with the discharge lamp 2 can then be inserted into the body 41 through the opened cover 42. A burner band 6 can be subsequently fitted to the burner band mounting section 41b of the body 41. The position of the discharge chamber 2b with respect to the mounting flange 41a is thus determined, and the discharge lamp 2 and body 41 of the resin base 3 are fixed by welding using laser heating, thermal welding, conductive welding, etc.

A ceramic plate 7 for protecting the body 41 and resin base 3 from heat generated by the discharge chamber 2b during lighting can be attached to the tip of the body 41. The ceramic plate 7 can also provide passageway for connecting the lamp to the low voltage terminal 3c. The driver unit 5 (high voltage transformer, starter circuit, etc.,) is preferably incorporated within the body 41 and covered with the cover 42 so that the high voltage portion is sealed.

The operation and effects of the lighting unit 1 of the invention of the above configuration will now be described. Because the resin base 3 and the driver case 4 of the invention are formed separately, optimum shapes can be provided for the resin base 3 and the driver case 4 without lowering the dielectric strength to high voltages or the ease of construction. A metal case 8 can be provided to further shield electromagnetic noise radiated from the driver unit 5.

The above described configuration provides particularly fine adjustment of the position of the discharge chamber 2b. Fine adjustment is possible because the discharge lamp 2 is supported by the resin base 3 in a state such that swinging of the discharge lamp 2 can occur at the body 41 of the driver case 4. Extension in the direction of the discharge chamber 2b is possible without creating difficulties in construction. The creeping distance between the high voltage terminal 3b and the hood 11 can therefore be dramatically increased while obviating the problems that occur in the related example.

As a result of the above construction, the body 41 projects within the reflector 10. However, the projecting portion of the body 41 can be covered by the hood 11 which prevents direct light from the discharge lamp 2 from radiating outside of the lighting unit 1. Thus, the portion of the body that extends into the reflector 10 has little or no influence on performance and cannot be seen from outside because of the hood 11. The external appearance of the lighting unit 1 is not diminished by the extending portion.

Figure 2:
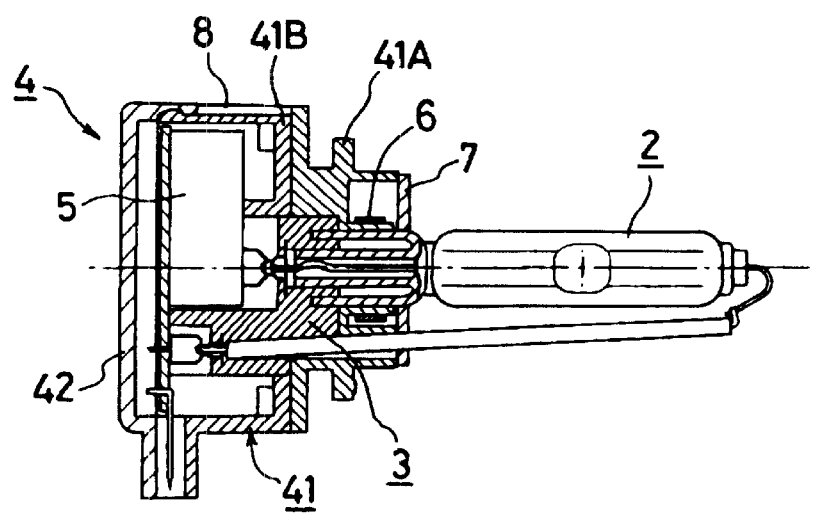
FIG. 2 is a cross-section view of another embodiment of a vehicle discharge lighting unit of the invention.
Figure 3:
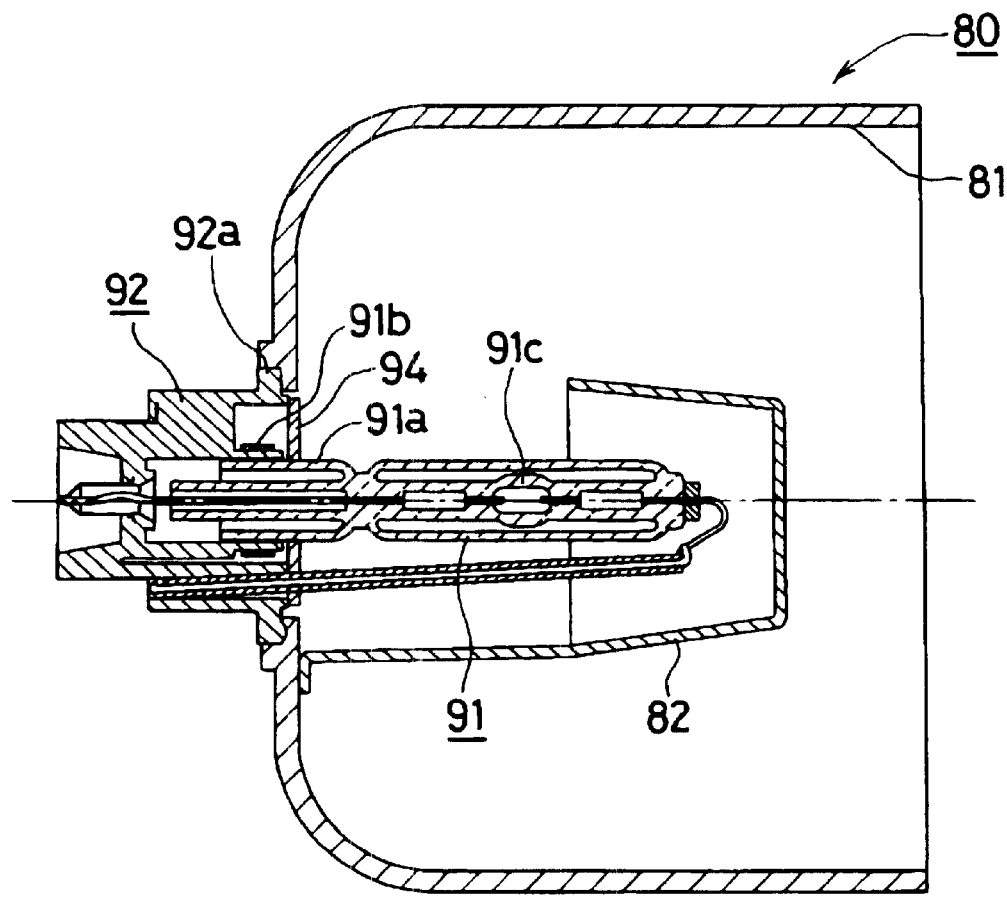
FIG. 3 is a cross-section view of a conventional discharge lighting unit.
Figure 4:
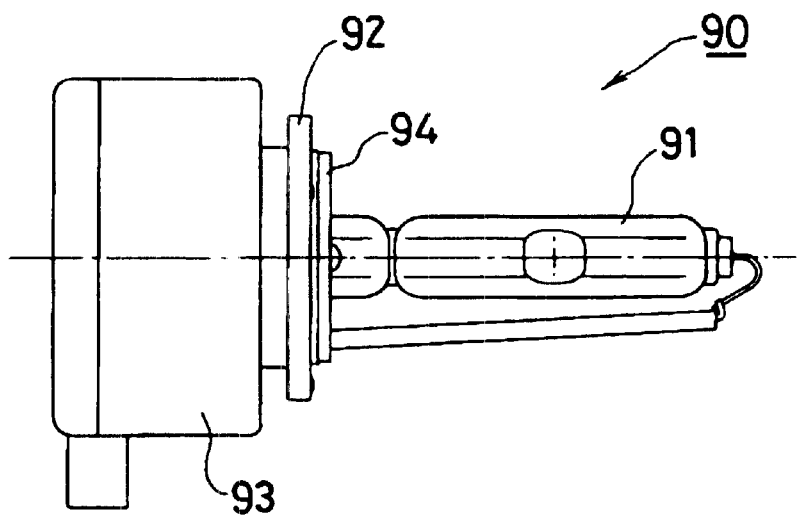
FIG. 4 is a side view of a conventional discharge lighting unit.

FIG. 2 shows another embodiment of the invention. The resin base 3 and the driver case 4 can be formed separately in this embodiment and can be shaped similar to the previous embodiment. However, in this embodiment, the body 41 can be separated into a front case 41A that engages with the resin base 3 so as to become fixed, and a rear case 41B that is not fixed to the resin base 3.

In a normal state, the front case 41A and the rear case 41B are connected together by a fastener such as a screw, etc. The process of assembly with the discharge lamp 2 and the process of fitting with the reflector 10 can be the same as for the previous embodiment.

When one of either the discharge lamp 2 or the driver unit 5 is defective, the fastening of the front case 41A and the rear case 41B can be released. Thus, the discharge lamp 2 and the resin base 3 attached to the front case 41A can be separately removed or the driver unit 5 attached to the rear case 41B can be separately removed. The specific part which has malfunctioned can then be easily replaced.

In the invention, a vehicle discharge lighting unit can be provided with a bulb mounting slot located in a resin base. A slot diameter corresponding to an outer bulb of the discharge lamp bulb section can include a broader input-side. A mounting flange for mounting a driver case can be provided to support the resin base and to mount to a reflector. A burner band mounting section can extend along a discharge chamber direction so as to cover the resin base 3 from the discharge lamp-side and project within the reflector. The invention permits optimum shapes for the combination of the resin base 3, driver case 4 and reflector 10 without complicating the assembly process or creating leaks between the high voltage terminal 3b and the lower part of the hood 11. Many problems of the related art are prevented, and serviceability is improved by the invention.

In addition, the driver case can be formed so as to be separable into a front case and a rear case. For example, the driver case can be separable along a direction at the resin base 3 substantially orthogonal to the axis of the discharge lamp 2. The resin base 3 supporting the discharge lamp 2 can also be formed integrally with the front case. The discharge lamp 2 and the driver unit 5 can therefore be separated so that if either one is defective, only the part that has malfunctioned needs to be replaced. Thus, the cost of maintenance for the consumer can be reduced and separation of the light components at the time of recycling by the manufacturer is facilitated and improved.

The material from which the different elements of the invention are made can vary so long as the material can achieve the functional purposes of the different elements. For example, the base 3 can be made from plastics, rubbers, woods, ceramics, metals or other materials.

The lamp is preferably a discharge light, but could be an incandescent, halogen, fluorescent or other type lamp. The specific geometry of the components of the lighting unit can also vary without departing from the spirit and scope of the invention.

It will be apparent to those skilled in the art that various modifications and variations can be made in the method and system of the present invention without departing from the spirit or scope of the invention. Thus, it is intended that the present invention cover the modifications and variations of this invention provided they come within the scope of the appended claims and their equivalents.

What is claimed is:

1. A vehicle lighting unit including a lamp, starter circuit, and transformer, said unit comprising:
    a base including a bulb mounting slot located at a discharge lamp bulb section;
    a driver case which houses the starter circuit and the transformer;
    a reflector;
    a mounting flange for supporting the base and mounting the driver case to the reflector; and
    a burner band mounting section extending towards the lamp and projecting within the reflector.

2. The vehicle lighting unit of claim 1, wherein the driver case includes a separable front case and rear case and the base supporting the lamp is formed integrally with the front case, so that changing of the lamp is possible.

3. The vehicle lighting unit of claim 1, wherein the lamp includes a bulb portion and the burner band fixes the bulb portion of the lamp.

4. The vehicle lighting unit of claim 1, wherein the lamp includes an outer bulb that is located in the bulb mounting slot such that the lamp is movable in order to determine its position with respect to the reflector.

5. The vehicle lighting unit of claim 1, wherein the driver case includes a front case and a rear case which are separable along a direction of the base that is substantially orthogonal to a longitudinal axis of the lamp.

6. The vehicle lighting unit of claim 1, wherein the lamp is a discharge lamp.

7. The vehicle lighting unit of claim 1, wherein the transformer is a high voltage transformer.

8. The vehicle lighting unit of claim 1, wherein the base is made from a resin material.

9. The vehicle lighting unit of claim 1, wherein the lamp includes a bulb portion having an outer diameter and the bulb mounting slot has a diameter that is slightly larger than an outer diameter of the bulb portion, the mounting slot narrows to approximately fit the outer diameter of the bulb portion.

10. A vehicle lighting unit, comprising:
    a base including a mounting slot;
    a lamp positionably located in the mounting slot on the base;
    a driver unit including a transformer and a starter circuit; and
    a driver case for housing the driver unit, the driver case including means for mounting the base at a predetermined position relative to the driver case and for being removably attached to the base;
    wherein the driver case includes a separable front case and rear case.

11. The vehicle lighting unit of claim 10, wherein the lamp is a discharge lamp.

12. The vehicle lighting unit of claim 10, further comprising:
    a reflector mounted to the base, wherein the base includes a burner band portion that extends into the reflector.

13. The vehicle lighting unit of claim 10, wherein the driver case includes a front case and a rear case that are separable, the front case including a mounting flange.

14. The vehicle lighting unit of claim 10, wherein the lamp includes a bulb portion having an outer diameter and the mounting slot has a diameter that is slightly larger than an outer diameter of the bulb portion and which narrows to approximately fit the outer diameter of the bulb portion.

15. A method for assembling a vehicle lighing unit that includes a base having a mounting slot, a lamp positionably located in the mounting slot on the base, a driver unit, a driver case configured to house the driver unit and mount the base at a predetermined position, the base being removably attached to the driver case, comprising the steps of:
    positioning the lamp in the mounting slot on the base;
    attaching the base in the driver case;
    connecting the driver case to the reflector.

16. The method of claim 15, further comprising the step of:
    opening a cover and positioning the base within the driver case through the opened cover.

17. The method of claim 15, wherein the step of positioning includes swinging the lamp within a narrowing portion of the mounting slot.

18. The method of claim 15, wherein the lamp is a discharge lamp.

* * * * *